(12) United States Patent
Yi et al.

(10) Patent No.: US 12,347,857 B2
(45) Date of Patent: Jul. 1, 2025

(54) DISORDERED ROCKSALT MATERIAL AND METHOD OF FORMING IT

(71) Applicant: Wildcat Discovery Technologies, Inc., San Diego, CA (US)

(72) Inventors: Tanghong Yi, San Diego, CA (US); Han Wang, San Diego, CA (US); Bin Li, San Diego, CA (US)

(73) Assignee: Wildcat Discovery Technologies, Inc., San Diego, CA (US)

(*) Notice: Subject to any disclaimer, the term of this patent is extended or adjusted under 35 U.S.C. 154(b) by 0 days.

(21) Appl. No.: 18/868,567

(22) PCT Filed: Jun. 1, 2023

(86) PCT No.: PCT/US2023/024132
§ 371 (c)(1),
(2) Date: Nov. 22, 2024

(87) PCT Pub. No.: WO2023/235473
PCT Pub. Date: Dec. 7, 2023

(65) Prior Publication Data
US 2025/0174644 A1  May 29, 2025

Related U.S. Application Data

(60) Provisional application No. 63/348,797, filed on Jun. 3, 2022.

(51) Int. Cl.
*H01M 4/505* (2010.01)
*C01G 45/22* (2025.01)
*H01M 4/02* (2006.01)

(52) U.S. Cl.
CPC .......... *H01M 4/505* (2013.01); *C01G 45/22* (2025.01); *C01P 2002/52* (2013.01); *C01P 2002/72* (2013.01); *C01P 2006/40* (2013.01); *H01M 2004/028* (2013.01)

(58) Field of Classification Search
CPC .......... H01M 4/505; H01M 2004/028; C01G 45/22; C01P 2002/72; C01P 2006/40; C01P 2002/52
See application file for complete search history.

(56) References Cited

U.S. PATENT DOCUMENTS

| | | | |
|---|---|---|---|
| 5,563,107 A | 10/1996 | Dubensky et al. | |
| 6,136,287 A | 10/2000 | Horne et al. | |
| 7,211,237 B2 | 5/2007 | Eberman et al. | |
| 8,535,832 B2 | 9/2013 | Karthikeyan et al. | |
| 8,722,250 B2 | 5/2014 | Park et al. | |
| 9,048,495 B2 | 6/2015 | Sun et al. | |
| 9,083,062 B2 | 7/2015 | Kumar et al. | |
| 9,093,712 B2 | 7/2015 | Kato et al. | |
| 9,692,043 B2 | 6/2017 | Takeuchi et al. | |
| 9,780,363 B2 | 10/2017 | Ceder et al. | |
| 9,865,872 B2 | 1/2018 | Nakahara et al. | |
| 10,280,092 B2 | 5/2019 | Carroll et al. | |
| 10,497,928 B2 | 12/2019 | Asano et al. | |
| 10,811,671 B2 | 10/2020 | Natsui et al. | |
| 10,833,315 B2 | 11/2020 | Nakatsutsumi et al. | |
| 10,833,322 B2 | 11/2020 | Natsui et al. | |
| 10,903,483 B2 | 1/2021 | O'Neill et al. | |
| 10,957,901 B2 | 3/2021 | Ceder et al. | |
| 10,978,706 B2 | 4/2021 | Ceder et al. | |
| 11,870,056 B2 | 1/2024 | Yi et al. | |
| 2010/0086854 A1 | 4/2010 | Kumar et al. | |
| 2013/0095385 A1 | 4/2013 | Tran et al. | |
| 2014/0099549 A1 | 4/2014 | Ceder et al. | |
| 2014/0138591 A1 | 5/2014 | Yoon et al. | |
| 2016/0233549 A1 | 8/2016 | Tiruvannamalai et al. | |
| 2018/0034042 A1 | 2/2018 | Carroll et al. | |
| 2018/0320284 A1 | 11/2018 | Opalka et al. | |
| 2019/0088945 A1 | 3/2019 | Ceder et al. | |
| 2020/0020943 A1 | 1/2020 | Natsui et al. | |
| 2020/0194790 A1 | 6/2020 | Ceder et al. | |
| 2021/0005883 A1 | 1/2021 | Natsui et al. | |
| 2021/0167373 A9 | 6/2021 | Ceder et al. | |
| 2022/0059816 A1 | 2/2022 | Yi et al. | |

FOREIGN PATENT DOCUMENTS

| | | |
|---|---|---|
| CN | 107546384 A | 1/2018 |
| CN | 109987650 A | 7/2019 |
| CN | 111952560 A | 11/2020 |
| WO | 2004110699 A2 | 12/2004 |
| WO | 2011131553 A2 | 10/2011 |
| WO | 2014055665 A2 | 4/2014 |

OTHER PUBLICATIONS

Cuartero, V. et al., "X-ray absorption and emission spectroscopy study of Mn and Co valence and spin states in TbMn1-x CoxO3.", Phys. Rev B 94, 155117; published Oct. 12, 2016. DOI: 10.1103/PhysRevB.94. 155117; 22 pages.

Han, Binghong et al. "Tailoring Alumina Based Interphases on Lithium Ion Cathodes", Journal of the Electrochemical Society, 165 (14) A3275-A3283 (2018) (10 pages).

Huang, Baojun et al., "Enhanced Cycling Stability of Cation Disordered Rock-Salt Li1.2Ti0.4Mn0.4O2 Material by Surface Modification With Al2O3", Frontiers in Chemistry, Mar. 2019, vol. 7, Article 107 (8 pages).

International Search Report and Written Opinion issued in copending International Application PCTUS2023024132 dated Sep. 6, 2023 (9 pages).

Lee et al. "Mitigating oxygen loss to improve the cycling performance of high capacity cation-disordered cathode materials." Nat. Commun. 8:981 (10 pages).

(Continued)

*Primary Examiner* — Sarah A. Slifka
(74) *Attorney, Agent, or Firm* — Young Basile Hanlon & MacFarlane, P.C.

(57) ABSTRACT

A disordered rocksalt (DRS) having improved characteristic has a cation comprised of lithium and one other metal and an anion comprised of oxygen and fluorine, and one or more of phosphorous, sulfur, and nitrogen. The substitution of one or more of P, S, and N on the oxygen anion site may realize improved cycle life of the battery and/or may be useful to make safer batteries.

20 Claims, 8 Drawing Sheets

(56) References Cited

OTHER PUBLICATIONS

Lun, Zhengyan et al., "Cation-disordered rocksalt-type high-entropy cathodes for Li-ion batteries", Nature Materials, vol. 20, Feb. 2021, pp. 214-221 (30 pages).
Wang et al. "A disordered rock-salt Li-excess cathode material with high capacity and substantial oxygen redox activity: Li1.25Nb0.25Mn0.5O2." Electrochemistry Communications 60; 2015 (4 pages).
Yabuuchi et al. "High-capacity electrode materials for rechargeable lithium batteries: Li3NbO4-based system with cation-disordered rocksalt structure" Proc. Natl. Acad. Sci. 2015; (6 pages).
Yu, Zhenlu et al. "Synthesis and Redox Mechanism of Cation-Disordered, Rock-Salt Cathode-Material Li—Ni—Ti—Nb—O Compounds for a Li-Ion Battery", ACS Appl. Mater. Interfaces 2019, 11, 3577-35787 (19 pages).
Li, Dong et al., "Surface Coating of Li-rich Manganese-Based Layered Cathode Materials—A Short Review." Journal of the Chinese Ceramic Society, vol. 45, No. 7, Jul. 2017 (12 pages). English Abstract only.

DISORDERED ROCKSALT MATERIAL AND METHOD OF FORMING IT

FIELD

The present invention is in the field of battery technology.

BACKGROUND

Lithium metal oxides have been used to formulate cathode materials for lithium ion batteries. The cathodes are derived from a few basic crystallographic structure types, such as spinels, olivines, and layered oxide structures. The layered oxide structures have included lithium-excess type structures, where additional lithium is present in the structure.

Recently, attention has been focused on disordered rocksalt structures, such as those formed from particular lithium metal oxides. Compounds represented by the formula:

$$x\text{Li}_3\text{NbO}_4 \cdot (1-x)\text{LiMO}_2 \qquad (1)$$

where M is a divalent or trivalent cation, have been shown to be a promising class of transition metal oxides for use as cathodes in lithium ion batteries. The compounds of formula (1) are considered a disordered rocksalt in which a random atomic arrangement of lithium and transition metal ions are packed in a closely-packed cubic structure. These disordered rocksalt compositions offer the ability to contain up to 3 lithium atoms per formula unit, which is more than the conventional lithium-excess layered materials. Formula (1) can be transformed and represented as $\text{Li}_x\text{M}_y\text{N}_z\text{O}_w$.

The disordered rocksalt structure is an attractive cathode material for next generation lithium ion batteries due to a greater specific energy density (e.g., a higher theoretical energy density) than state-of-the-art cathode materials, such as layered lithium metal oxide structures. For example, certain disordered rocksalt structure materials have a theoretical gravimetric energy density of about 1120 Wh/kg, while a $\text{LiMn}_2\text{O}_4$ active material has a theoretical gravimetric energy density of about 492 Wh/kg and a $\text{LiMn}_{1.5}\text{Ni}_{0.5}\text{O}_4$ has a theoretical gravimetric energy density of about 691 Wh/kg. This energy density is especially appealing when lower cost raw materials are used as components in the disordered rocksalt structure, such as manganese. As such, the disordered rocksalt materials can achieve relatively high energy density with relatively low material cost. In order to achieve comparable energy density, known cathode materials require higher-cost raw materials, such as cobalt or nickel.

Disordered rocksalt materials have tended to have a shorter cycle life compared to incumbent lithium ion batteries. Recently, attempts to improve the cycle life of disordered rock salt batteries has been described by substituting some of the oxygen with fluorine such as described in U.S. Pat. No. 10,280,092. Nevertheless, it would be desirable to provide a battery comprised of disordered rocksalt cathodes having longer life and other desirable attributes such as safer batteries.

BRIEF SUMMARY

We discovered an improved disordered rocksalt (DRS). A DRS may exhibit longer long term cycle life. A DRS may exhibit a lower oxygen redox voltage, which may in turn allow safer batteries (exhibit a lower charging voltage plateau on the oxygen redox plateau). The lower charging voltage of the plateau is an advantage in that the battery electrolyte is exposed to conditions less likely to cause it to oxidize. It has been discovered that the addition of F in combination with any one or all of P, S and N results in the aforementioned desirable attributes while maintaining the same initial capacity, but with improved life as well as other attributes. Each of these substitutes for some of the oxygen (anion) in a disordered rock salt structure. In the DRS, the majority of the anion is oxygen, with the balance being comprised of the F, P, S, and N as described above (O substitutes). The ratio of F/(P, S, and N) may be any useful, but desirably is 1 or greater to 100, 50, 25, 20, or 15 by mole. The combination of F with any one of P, S and N improves one or more attributes, which may be different. That is, P, S, and N may be used alone or in combination depending on the desired attribute or attributes.

Herein, when a majority is specified of a component, it means more than 50% by mole or (readily understood from the context used) to essentially all of that component (99% or less). That is, the majority specified constituent of a component is present in an amount greater than 50% to 99%, 90, 80%, 70% or 60% of that component. When a minority of a component is a specified constituent, it is present in an amount less than 50% to about 1% with the balance being the majority specified constituent.

The composition comprises a disordered rock salt having a cation comprised of lithium and at least one other metal and an anion comprised of oxygen, fluorine and one or more of phosphorous, sulfur, and nitrogen. Desirably, the oxygen is the majority of the anion with the minority being comprised of F and one or more of P, S and N. The fluorine is the majority of two or more of the F, S, P and N. Illustratively, it is desirable for the F/(P, S and N) ratio to be at least 1 to 100, 50, 25, 10, 5 or 2.

The DRS may be used in primary and secondary batteries lithium ion batteries. The DRS may be used with any suitable electrolyte, separator and anode such as those known in the art.

DETAILED DESCRIPTION

Figure 1:
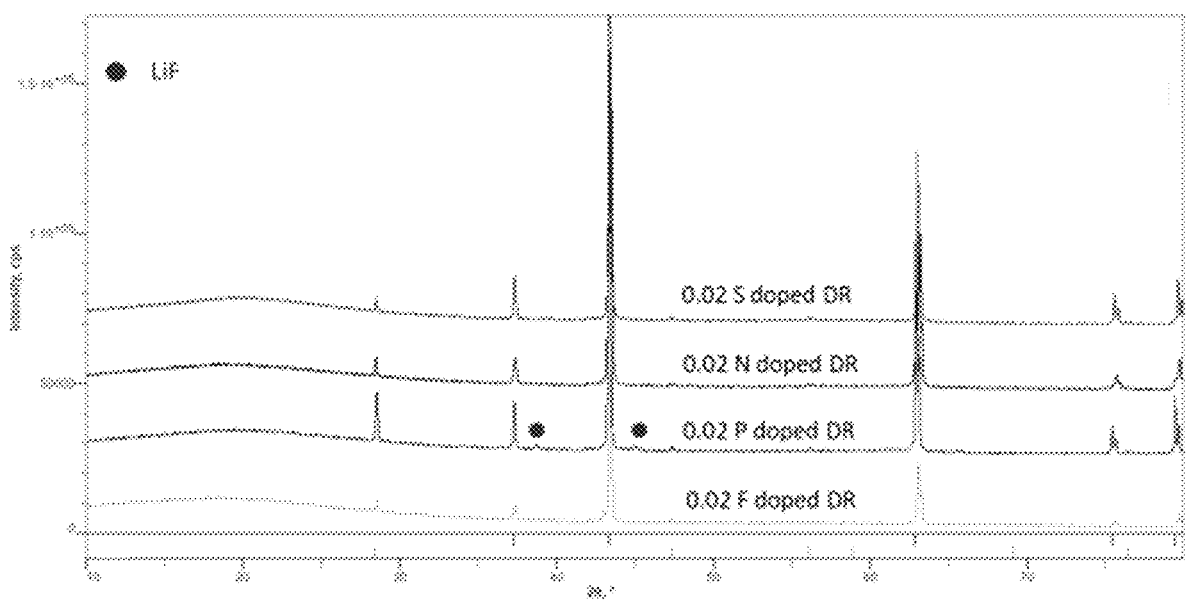
FIG. 1 shows X-ray diffraction plots of the disordered rock salt the present invention and plot of a disordered rock salt not of this invention.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

To the extent certain battery characteristics can vary with temperature, such characteristics are specified at 30 degrees C., unless the context clearly dictates otherwise.

Ranges presented herein are inclusive of their endpoints. Thus, for example, the range 1 to 3 includes the values 1 and 3 as well as the intermediate values.

The DRS compositions and morphology (e.g., structure) are useful in formulating electrodes of electrochemical cells. More specifically, the DRS may be used to form the cathode. The lithium ion battery includes an electrolyte formulation with a lithium salt present at a concentration suitable for conducting the lithium ions through the electrolyte formulation between the cathode and an anode during the discharge and recharge operations.

In a disordered rocksalt both lithium and a transition metal occupy a cubic close-packed lattice of octahedral sites. In electrochemical reactions, lithium diffusion proceeds by the lithium hopping from one octahedral site to another octahedral site via an intermediate tetrahedral site. Lithium in the intermediate tetrahedral site is the activated state in lithium diffusion. The activated tetrahedral lithium ion shares faces with four octahedral sites as follows: (i) the site previously occupied by the lithium ion itself; (ii) the vacancy the lithium ion will move into; and (iii & iv) two sites that can be occupied by lithium, a transition metal, or a vacancy.

The composition may be a disordered rocksalt (DR) comprising one having a formula:

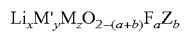

$$Li_xM'_yM_zO_{2-(a+b)}F_aZ_b$$

where $1.0 < x < 1.75$; $0 \leq y < 0.55$; $0.1 < z < 1$; $0 \leq (a+b) < 0.7$; $(b>0)$; M' is one of Ti, Ta, Zr, W, Nb, or Mo; M is one or more of Ti, V, Cr, Mn, Fe, Co, Ni, Cu, Zn, Al, Zr, Y, Mo, Ru, Rh, Sn, Bi and Sb; Z is one or more of P, N and S. Further dopants may be included such as those substituting for Li such as Na and Mg, which may be at any useful amount, but generally are at most about 10% or 5% to 0.01% by mole of the lithium and such dopants present in the DR.

The amount of F and Z may be a majority or minority of the anion (i.e., O, F and one or more of P, S and N). Illustratively (a+b) is 0.05 to 1.5, 1, 0.95, 0.8, 0.65, 0.5. It may be desirable for a to be 0.05 to 0.25. Z may be any combination of P, N and S, or may be just one of them. The ratio between P, N and S when two or more are present may be any useful ratio depending on the attributes sought. For example, it may be desirable to have S present when a reduced redox potential is desired. It may also be desirable for S to be the majority of the P, S and N present in the composition.

The composition may have any desirable Li of 1 or above, but it may be desirable for Li as represented by x to be at least 1.1, 1.15, 1.2 to 1.65, 1.5 or 1.4.

The cation of the composition may be the metals described, but desirably, at least one of the metals as represented by M is comprised of one or more of Ti, Mn, Fe, Co, V, Cr, Ni and Cu. It may be desirable for M to be comprised of Ti and Mn. The composition may illustratively be one where M' is comprised of Nb. When Nb is present, it may desirable for M to be comprised of Mn. Illustratively, M' may be Nb and M may be Mn. When Nb and Mn are present with or without other metals, they may be present in a ratio of Mn/Nb of 1 or 2 to 200, 150, 100, 75, 50, 25 or 10 by mole.

The DRS may be made by any suitable method such as those known in the art to make disordered rocksalts. Illustrative methods are described in U.S. Pat. Nos. 10,280,092, 10,978,706 and ACS Appl Mater Interfaces. 2019 Oct. 2; 11 (39): 35777-35787, each incorporated herein by reference.

Illustratively, the DRS desirably is comprised of micro-sized clusters or agglomerations of sub-micro-sized particles, which may be useful to increase the capacity and energy density of a battery cathode. The micro-sized clusters are also referred to herein as secondary particles. The secondary particles desirably have average particle sizes (e.g., diameters) in the micrometer scale, such as between 1 micrometer and 20 micrometers. The sub-micro-sized particles cluster to form the secondary particles. The sub-micro-sized particles are also referred to herein as primary particles. The terms "primary" and "secondary" indicate that the primary particles are formed before the secondary particles, and the secondary particles are agglomerations of the primary particles. The primary particles have average particle sizes (e.g., diameters) in the nanometer scale, such as less than 400 nanometers. The sub-micro primary particles of disordered rocksalt material may provide desirable conductivity and the micro-sized secondary particles of the disordered rocksalt material yield high electrode energy density.

To form the micro-sized cluster a suspension of precursors may be milled to form a mixture of primary particles in the suspension. The precursors include metal compounds and are selected based on the desired composition of the DRS material. One or more of the precursors may be compounds (e.g., metal compound) comprised of oxygen, fluorine and one or more P, S and N, such as oxides, hydroxides, oxynitrides, nitrides, nitrates, sulfides, sulfates, sulfites, phosphates, phosphites, fluorides and combinations thereof. Examples of precursors may include $Mn_2O_3$, LiOH, $Nb_2O_5$, LiF, $NbF_5$, and/or the like. For doping the oxygen site with one or more of P, S and N at least one precursor includes one of these elements. Possible P, S and N precursors may include elemental P, S or N, metal nitrides (e.g. lithium nitride), metal nitrates, metal nitrites, metal phosphates, metal phosphides, metal phosphites, metal sulfites, metal sulfates, metal sulfides (e.g., lithium sulfide), wherein the metal is one that is desired in the DRS and combination thereof.

The precursors may be mixed, at the desired amounts to realize the desired DRS stoichiometry, in a liquid such as water to make a suspension. The milling may be performed by any method useful to realize the desired particle size with examples being a micromedia mill, ball mill, planetary mill or attrition mill. The primary particles may have an average particle size that is at most 2 micrometer, 1 micrometer, 400 nanometers (nm), 200 nm, or 100 nm. For example, the average particle size could be no greater than 50 nm, 40 nm, 30 nm, 20 nm, or the like. An Example of a suitable micro bead mill is a Buhler PML2 mill (Buhler Group).

The suspension of precursor particles may then be dried by any suitable method such as spray drying to form secondary particles. The spray drying may be performed using any known commercially available spray dryer such as a mini spray dryer, such as the Buchi B-290 model.

The spray dried precursor particles may then be heated to an annealing temperature. The annealing temperature causes the precursors in the secondary particles to react and form a single phase. Desirably, the temperature and time are such that the resulting DRS retains the micro-sized, spray dried secondary particle morphology. The annealing temperature may be from 500° C., 750° C. to 900° C., 1000° C. or 1200° C. for a time period from 10 min, 1, 2, 3, or 5 hours to 12 or 24 hours.

The annealing process may be performed under any suitable atmosphere, which may be static or flowing. The annealing environment may be under a noble gas, nitrogen, atmospheric air or dry air and combination thereof to realize a desired partial pressure of one or more gases. In other embodiments, the annealing conditions may be selected based on the compositions of the disordered rocksalt precursors, such as which metals are present. For example, a manganese-based composition may utilize the conditions above (e.g., 750-900° C. for between 6 and 24 hours), whereas a composition based on another metal may have a broader temperature range, a higher range, or a lower range and/or a broader, longer, or shorter range of time periods, or multiple steps of annealing.

In an alternative embodiment, instead of milling and spray drying the lithium-containing precursors with the other precursors, the lithium source may be kept aside until the annealing step. For example, the spherical secondary particles may be produced as described above, except that the precursors lack lithium. These are then mixed with a lithium compound and annealed as described above. The mixing may be any suitable and desirable method that minimizes the comminution of the spray dried secondary particles such as a V-blender.

The DRS phase may be formed prior to milling. For example, the DRS phase may be formed via a solid state chemistry method, such as a solid-state redox reaction of oxide ions, which may employ milling of the precursors. The formed DRS phase may be milled and subsequently spray dried and other additives such as carbon may be added. The one or more carbon precursors may include acetylene black, carbon black, carbon fiber, graphite, carbon nano-tube KJ600, and/or the like. The one or more carbon precursors may be milled at a ratio in which the disordered rocksalt powder represents a majority and the carbon precursors represent a minority. For example, the ratio may be 60:40 to 99:1 DRS powder to the carbon precursor(s).

The DRS may be used to form a cathode by any suitable method such as those known in the art. For example, the DRS powder may be mixed with a binder such a polymer useful to make cathodes (e.g., polyfluoropolymer such as polyvinylidene fluoride) and one or more solvents to form a slurry. Non-limiting examples of the one or more solvents may be an aprotic polar solvent such as methyl-2-pyrrolidinone (NMP). The slurry may then be deposited on a metal current collector (e.g., stainless steel, copper, or any suitable conductive metal thin) and the solvent removed to form the cathode.

Desirably the DRS of the cathode has an average secondary particle size of 1 to 20 micrometers. Each of the secondary particles is an agglomeration of primary particles. The DRS primary particles desirably have an average particle size as described herein and may contain other particles that may be useful such as increasing the electrical conductivity (e.g., carbon or other inorganic high ionic conductive particles).

The DRS cathode may be used in a rechargeable lithium ion battery cell. The battery cell includes the cathode, an anode, separator and electrolyte. The battery or battery cell may be formed in any suitable atmosphere such as common in the art. For example, a high purity argon atmosphere may be used to limit any undesirable contamination from species present in atmospheric air.

ILLUSTRATIONS

Illustration 1. A composition comprising a disordered rock salt having a cation comprised of lithium and at least one other metal and an anion comprised of oxygen and fluorine, and one or more of phosphorous, sulfur, and nitrogen.

Illustration 2. The composition of illustration 1, wherein oxygen is the majority of the anion.

Illustration 3. The composition of illustration 2, wherein fluorine is the majority of the fluorine and one or more of phosphorous, sulfur and nitrogen.

Illustration 4. The composition of illustration 1, wherein F/(P, S and N) is 1 to 25 by moles.

Illustration 5. The composition of illustration 1 wherein the disordered rock salt is represented by $$Li_xM'_yM_zO_{2-(a+b)}F_aZ_b$$

where $1.0<x<1.75$; $0\leq y<0.55$; $0.1<z<1$; $0\leq(a+b)<0.7$; $(b>0)$; M' is one of Ti, Ta, Zr, W, Nb, or Mo; M is one or more of Ti, V, Cr, Mn, Fe, Co, Ni, Cu, Zn, Al, Zr, Y, Mo, Ru, Rh and Sb; and Z is one or more of P, N and S.

Illustration 6. The composition of illustration 5, wherein (a+b) is 0.05 to 1.5.

Illustration 7. The composition of illustration 6, wherein (a+b) is 0.05 to 0.95.

Illustration 8. The composition of any one of illustrations 5 to 7, wherein a is from 0.05 to 0.25.

Illustration 9. The composition of any one of illustrations 5 to 8, wherein Z is P, N or S.

Illustration 10. The composition of any one of illustrations 5 to 9, wherein M' is Nb and y is greater than 0.

Illustration 11. The composition of any one of illustrations 5 to 10, wherein x is from 1.1 to 1.65.

Illustration 12. The composition of any one of illustrations 5 to 11, wherein x is from 1.15 to 1.5.

Illustration 13. The composition of any one of illustrations 5 to 12, wherein x is from 1.2 to 1.4.

Illustration 14. The composition of any one of illustrations 5 to 13, wherein M is comprised of one or more of Ti, Mn, Fe, Co, V, Cr, Ni and Cu.

Illustration 15. The composition of illustration 14, wherein M is comprised of Ti and Mn.

Illustration 16. A cathode for a rechargeable battery, the cathode comprising a disordered rock salt powder having a cation comprised of lithium and one other metal and an anion comprised of oxygen and fluorine, and one or more of phosphorous, sulfur, and nitrogen.

Illustration 17. The cathode of illustration 16, wherein the disordered rocksalt powder is represented by:

$$Li_xM'_yM_zO_{2-(a+b)}F_aZ_b$$

where $1.0<x<1.75$; $0\leq y<0.55$; $0.1<z<1$; $0\leq(a+b)<0.7$; $(b>0)$; M' is one of Ti, Ta, Zr, W, Nb, or Mo; M is one or more of Ti, V, Cr, Mn, Fe, Co, Ni, Cu, Zn, Al, Zr, Y, Mo, Ru, Rh and Sb; and Z is one or more of P, N and S.

Illustration 18. The cathode of illustration 16 or 17, wherein the cathode has an anion redox voltage that is reduced compared to a disordered rocksalt cathode failing to have P, S or N.

Illustration 19. The cathode of illustration 17, wherein at least some portion of Z is comprised of S.

Illustration 20. The cathode of illustration 19, wherein Z is solely comprised of S.

Illustration 21. The cathode of any one of illustrations 17 to 20, wherein M' is comprised of Nb and M is comprised of Mn.

Illustration 22. The cathode of illustration 21, wherein Mn/Nb by moles is from 1 to 10.

Illustration 23. The cathode of illustration 22, wherein Mn/Nb by moles is from 2 to 5.

Illustration 24. A lithium ion battery comprised of a cathode of any one of illustrations 16 to 23.

Illustration 25. The cathode of illustration 16, wherein y is greater than 0.01.

EXAMPLES

Comparative Example (Control)

The Disordered rocksalts were synthesized using $Mn_2O_3$, $Li_2CO_3$, $Nb_2O_5$, and LiF precursors in amounts targeted to realize a disordered rock salt represented by $Li_{1.31}Mn_{0.4}Nb_{0.1}Ti_{0.19}O_{1.77-x}F_{0.23}A_x$ where x is zero. The precursors were mixed in deionized water to make a suspension, which was a planetary ball milled for 5 h in using zirconia media to form a mixture. The mixture was dried at 100° C. for 12 h under air, then annealed at 800° C. for 4 hours and 900° C. for 12 hours in flowing argon to obtain the disordered rocksalt (DRS). The DRS was milled with a carbon precursor (either acetylene black, carbon black, carbon fiber, graphite, carbon nano-tube or KJ600) in a 93:7 (powder to carbon weight ratio) as the active cathode material mixture.

Examples

The disordered rock salts of the Examples were made in the same way as above, but with addition of different dopant precursors in the first mixing to replace 0.01 and 0.02 moles (i.e., x is 0.01 or 0.02) of the oxygen/fluorine present in the disordered rock salt of the Comparative Example. Phosphorus, $Li_3N$ and $Li_2S$ were used as dopant precursors for P, N and S dopant, respectively.

Half cells were made having an area akin to a coin-type cell and tested electrochemically cycling between 1.5-4.6V versus Li anode at 30° C.

Battery cells were formed in a high purity argon filled glovebox (M-Braun, $O_2$ and humidity content <0.1 ppm). The cathode was prepared by mixing the active cathode mixture with poly(vinylidene fluoride) (PVDF, Sigma Aldrich) and 1-methyl-2-pyrrolidinone (NMP, Sigma Aldrich) and conductive carbon to give a ratio of active material: carbon:PVDF=90:7:3, and the resulting slurry was deposited on a stainless steel current collector by a pipette and dried to form a composite cathode film of ~2 mg/cm². For the anode, a thin Li foil (~300 μm, Gotion) was cut into the required size. Each battery cell included the composite cathode film, a polypropylene separator (Celgard 2400), and a lithium foil anode. An electrolyte (1.0M LiPF6 in EC/EMC (1:2 v/v)) containing lithium hexafluororophosphate ($LiFP_6$) in a mixture of ethylene carbonate (EC) and ethyl methyl carbonate (EMC) with an additive (2 wt %) was used. The battery cell was sealed and cycled between 1.5-4.6V at 30° C. with a formation rate of C/20 and cycling rate of C/3, where 1 C=300 mAh/g.

The X-ray diffraction of the Control and the Example disordered rock salts are shown in FIG. 1. The doping level of the Examples shown in FIG. 1 correspond to an amount where x is 0.02. The X-ray plots show disordered rock salt structures. However, it is noted that the phosphorous doped Example, displayed some residual LiF, which indicates that method of formation when using phosphorous as a dopant may require differing conditions to fully react the LiF (e.g., change in temperature or milling time).

Figure 2:
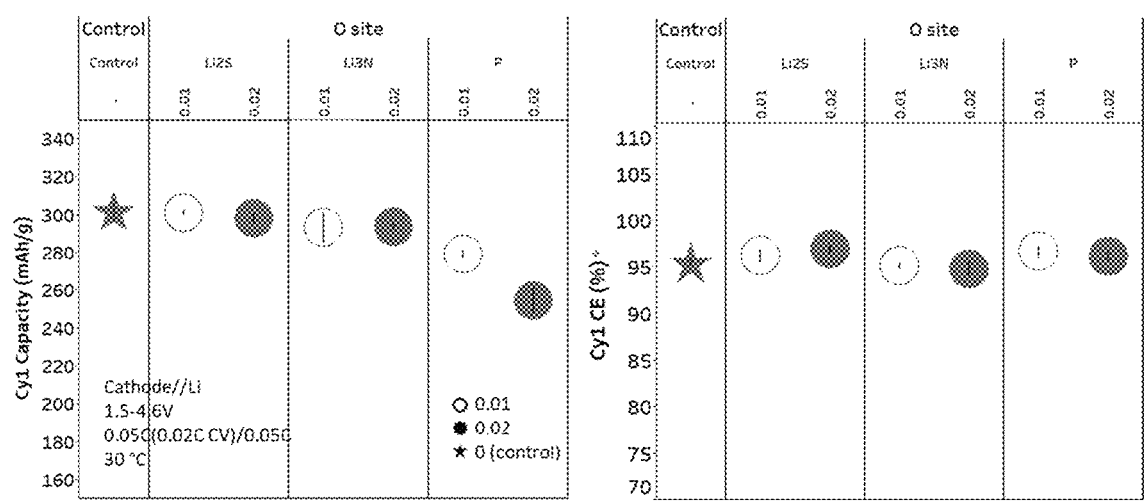
FIG. 2 shows the first cycle capacity and coulombic efficiency of half cells of disordered rock salts of the invention and a disordered rock salt not of this invention.

The first cycle specific capacity and coulombic efficiency of the Control and Examples doped at x=0.01 and 0.02 are shown in FIG. 2. The specific capacity and coulombic efficiency are determined using the half cells as described above. The results show that the 1st cycle specific capacity and coulombic efficiency were essentially the same for the S and N doped Examples. The decrease in specific capacity of the P doped Examples are attributed to the presence of LiF and the incomplete formation of the disordered rock salt.

Figure 3:
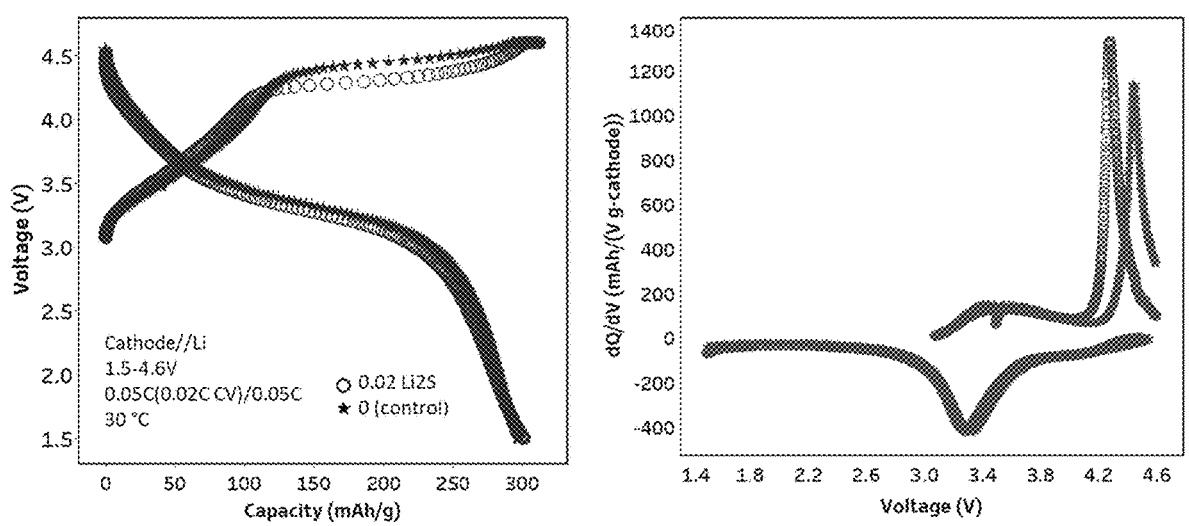
FIGS. 3-5 show the first cycle capacity and (dQ/dV) plots of batteries having disordered rock salt cathodes of the invention and cathodes having disordered rock salt cathodes not of this invention.
Figure 4:
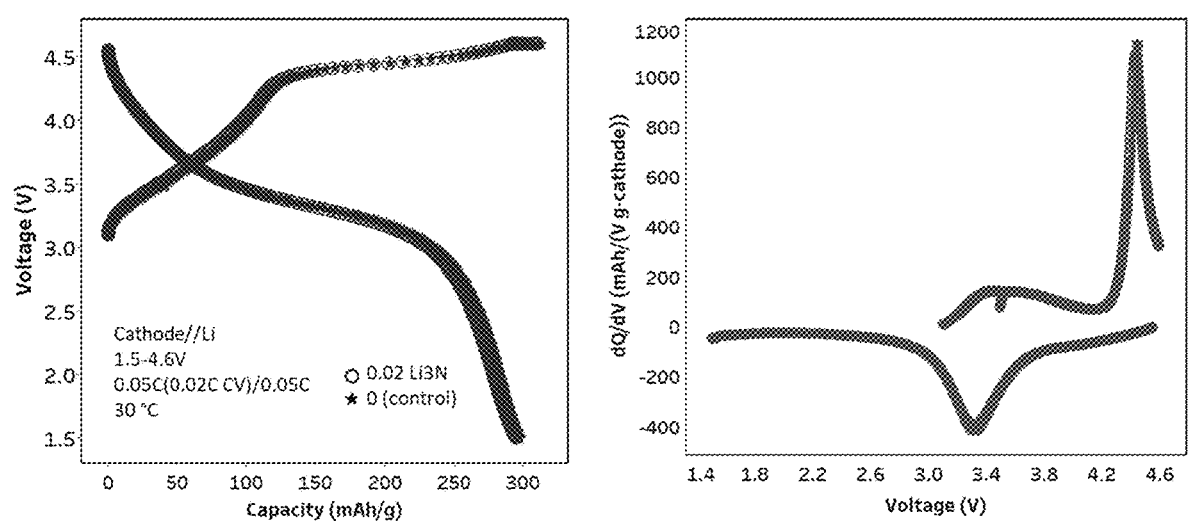
Figure 5:
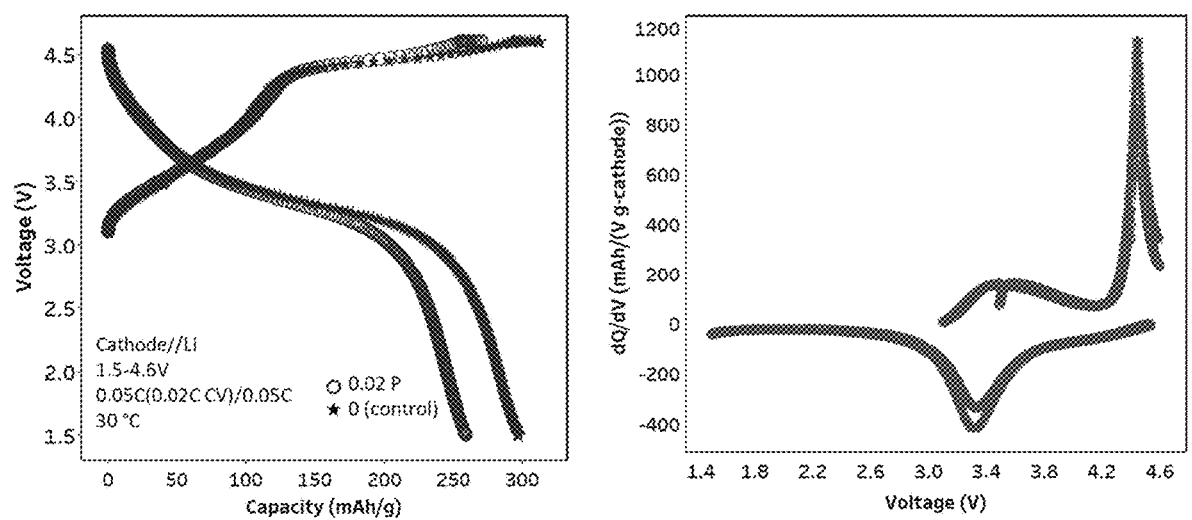

The first cycle voltage profiles the Control and the Example containing sulfur and dV/dQ (Q=capacity) are shown in FIG. 3 of the batteries. The sulfur doped material shows a lower voltage plateau on the oxygen redox plateau. Sulfur may give up electrons more easily which may provide a more delocalized electron cloud on the oxygen, making it easier to oxidize. A lower charging voltage plateau may be an advantage as the electrolyte does not have to be as oxidatively stable. The sulfur doped material also shows smaller overpotential between charge and discharge (the dQ/dV plot) which may be allow for a battery with lower impedance and better energy efficiency. The $1^{st}$ cycle voltage profiles of the N and P doped Examples and the control are shown in FIGS. 4 and 5.

Figure 6:
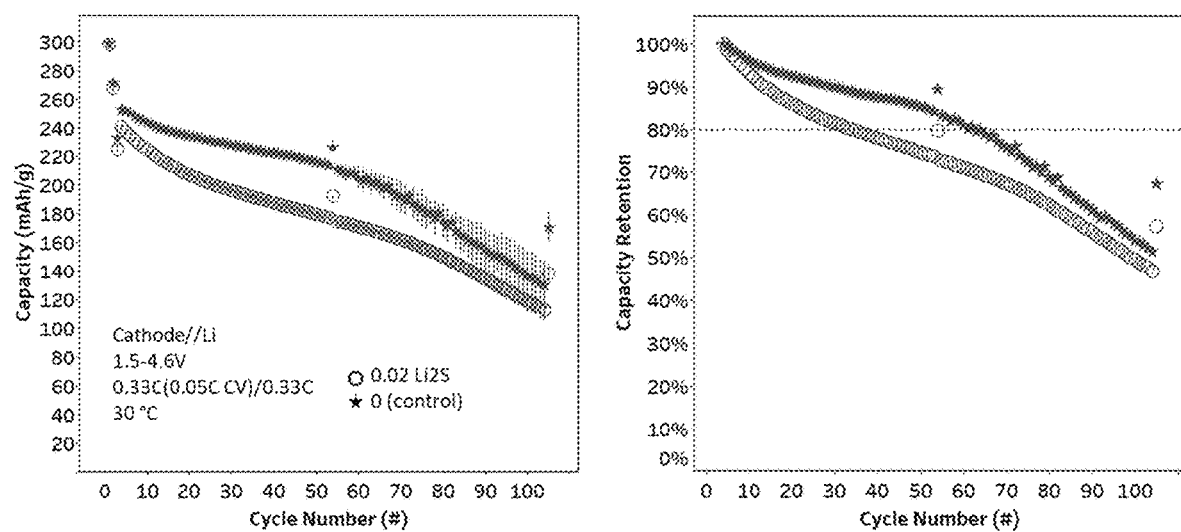
FIGS. 6-8 show the capacity versus the number of cycles of batteries of and not of this invention.
Figure 7:
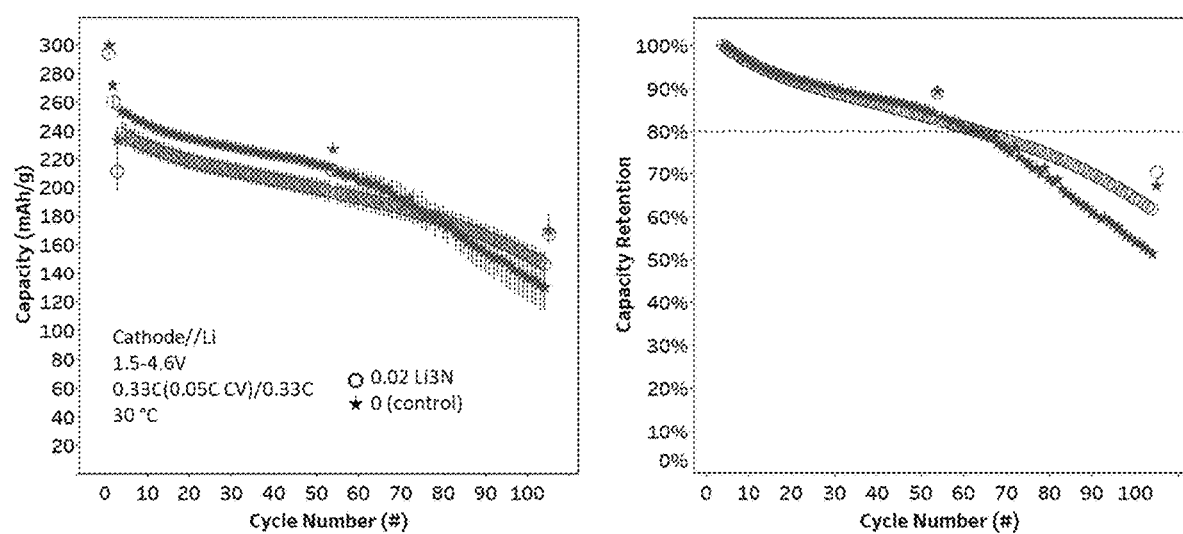
Figure 8:
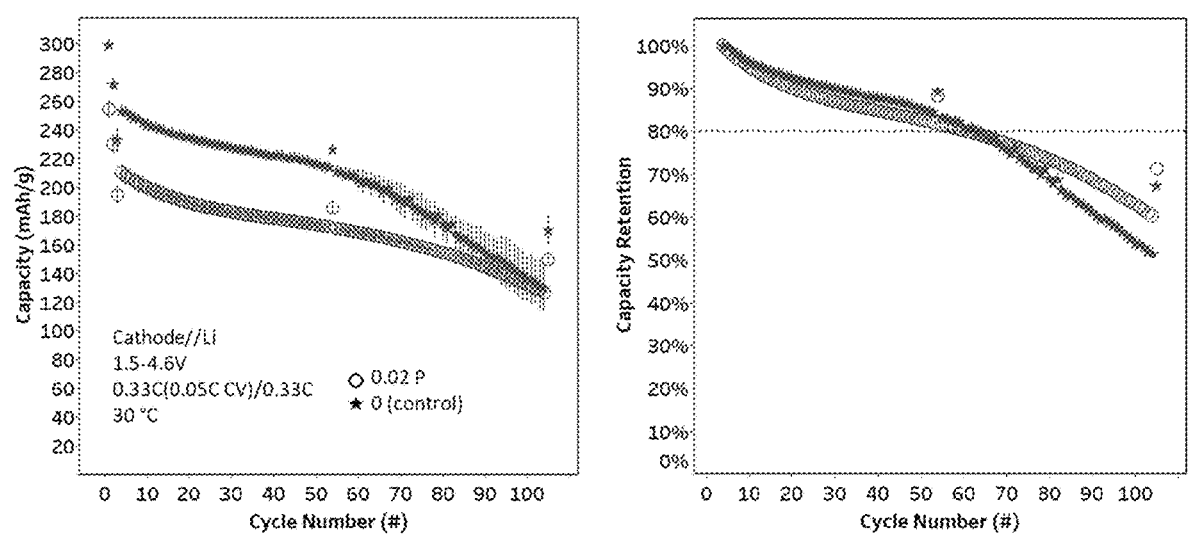

The N and P doped Examples show improved long-term cycle life relative to the control (F-doped only). (see FIG. 6-8). However, the S doped samples show worse cycle performance, which may be related to more oxygen redox capacity contribution. In other words, if more capacity is coming from the oxygen in the doped material (relative to the control), the cycle life will decrease. But the cycle performance of S doped samples may be improved by lowering the upper voltage cutoff as the oxygen redox happens at lower potential for S doped samples.

What is claimed is:

1. A composition comprising a disordered rock salt having a cation comprised of lithium and at least one other metal and an anion comprised of oxygen and fluorine, and one or more of phosphorous, sulfur, and nitrogen.

2. The composition of claim 1, wherein oxygen is the majority of the anion.

3. The composition of claim 2, wherein fluorine is the majority of the fluorine and one or more of phosphorous, sulfur and nitrogen.

4. The composition of claim 1, wherein F/(P, S and N) is 1 to 25 by moles.

5. The composition of claim 1 wherein the disordered rock salt is represented by $Li_xM'_yM_zO_{2-(a+b)}F_aZ_b$
   where 1.0<x<1.75; 0≤y<0.55; 0.1<z<1; 0≤(a+b)<0.7; (b>0); M' is one of Ti, Ta, Zr, W, Nb, or Mo; M is one or more of Ti, V, Cr, Mn, Fe, Co, Ni, Cu, Zn, Al, Zr, Y, Mo, Ru, Rh and Sb; and Z is one or more of P, N and S.

6. The composition of claim 5, wherein (a+b) is 0.05 to 1.5.

7. The composition of claim 6, wherein (a+b) is 0.05 to 0.95.

8. The composition of claim 5, wherein a is from 0.05 to 0.25.

9. The composition of claim 5, wherein Z is P, N or S.

10. The composition of claim 5, wherein M' is Nb and y is greater than 0.

11. The composition of claim 5, wherein x is from 1.1 to 1.65.

12. The composition of claim 11, wherein x is from 1.15 to 1.5.

13. The composition of claim 12, wherein x is from 1.2 to 1.4.

14. The composition of claim 5, wherein M is comprised of one or more of Ti, Mn, Fe, Co, V, Cr, Ni and Cu.

15. The composition of claim 14, wherein M is comprised of Ti and Mn.

16. A cathode for a rechargeable battery, the cathode comprising a disordered rocksalt powder having a cation comprised of lithium and one other metal and an anion comprised of oxygen and fluorine, and one or more of phosphorous, sulfur, and nitrogen.

17. The cathode of claim 16, wherein the disordered rocksalt powder is represented by: $Li_xM'_yM_zO_{2-(a+b)}F_aZ_b$ where $1.0<x<1.75$; $0 \leq y<0.55$; $0.1<z<1$; $0 \leq (a+b)<0.7$; (b>0); M' is one of Ti, Ta, Zr, W, Nb, or Mo; M is one or more of Ti, V, Cr, Mn, Fe, Co, Ni, Cu, Zn, Al, Zr, Y, Mo, Ru, Rh and Sb; and Z is one or more of P, N and S.

18. The cathode of claim 17, wherein at least some portion of Z is comprised of S.

19. The cathode of claim 18, wherein Z is solely comprised of S.

20. The cathode of claim 16, wherein the cathode has an anion redox voltage that is reduced compared to a disordered rocksalt cathode failing to have P, S or N.

* * * * *